United States Patent [19]

Punderson

[11] 4,150,013

[45] Apr. 17, 1979

[54] MELT PROCESSIBLE TETRAFLUOROETHYLENE COPOLYMERS CONTAINING ORGANO POLYSILOXANES

[75] Inventor: John O. Punderson, Marietta, Ohio

[73] Assignee: E. I. Du Pont de Nemours and Company, Wilmington, Del.

[21] Appl. No.: 750,797

[22] Filed: Dec. 17, 1976

Related U.S. Application Data

[63] Continuation of Ser. No. 645,218, Dec. 29, 1975, abandoned.

[51] Int. Cl.$^2$ ............................................. C08L 27/18
[52] U.S. Cl. ............................. 260/42.26; 260/42.27; 260/827; 260/900; 526/1; 526/250; 526/253; 526/254
[58] Field of Search ...................... 260/827, 900, 42.26, 260/42.27; 526/1, 250, 253, 254

[56] References Cited

U.S. PATENT DOCUMENTS

| | | | |
|---|---|---|---|
| 2,976,257 | 3/1961 | Dawe | 260/14 |
| 3,062,764 | 11/1962 | Osdal | 260/29.3 |
| 3,150,207 | 9/1964 | Gore | 260/827 |
| 3,207,825 | 9/1965 | Tully | 260/127 |
| 3,325,434 | 6/1967 | Tully | 260/29.6 |
| 3,391,221 | 7/1968 | Gore | 260/857 |
| 3,415,900 | 10/1968 | Robb | 260/827 |
| 3,538,028 | 11/1970 | Morgan | 260/827 |

FOREIGN PATENT DOCUMENTS 1212725 3/1966 Fed. Rep. of Germany ........... 260/827

*Primary Examiner*—Harold D. Anderson

[57] ABSTRACT

Compositions which when coated onto wire as insulation have good resistance to deterioration under low voltage AC stress in hot water are provided which comprise a melt-processible copolymer consisting essentially of units of tetrafluoroethylene and at least one comonomer that is a selected ethylenically unsaturated fluorinated monomer, and an organo-polysiloxane that is substantially stable and nonvolatile at the temperature of melt-processing for the copolymer used, is substantially incompatible with the copolymer, and is dispersed in the copolymer. The compositions are prepared by employing techniques which provide sufficient transporting pressure to transport the components into a mixing zone, and which provide shearing action sufficient to cause the organopolysiloxane to disperse.

24 Claims, No Drawings

MELT PROCESSIBLE TETRAFLUOROETHYLENE COPOLYMERS CONTAINING ORGANO POLYSILOXANES

CROSS-REFERENCE

This application is a continuation-in-part of U.S. application Ser. No. 645,218, filed Dec. 29, 1975 now abandoned.

FIELD OF THE INVENTION

This invention relates to melt-processible tetrafluoroethylene copolymers, and more specifically to such copolymers which contain an organo-polysiloxane additive.

BACKGROUND OF THE INVENTION

1. Electrical Wire Insulation

The deterioration and breakdown of electrical insulation under stress of applied voltage has been studied, and some aspects of insulation failure are well understood. For example, it is well known that application of very high voltages (e.g., 2000–3000 volts or more) to electrical apparatus of certain configurations gives rise to the phenomenon of corona discharge and that such corona can cause progressive deterioration and failure of insulation. The corona discharge can occur under influence of both direct current (DC) and alternating current (AC) potential and can occur in both wet and dry environments. It is further well known that insulation failure due to corona discharge can be greatly reduced or eliminated by proper design of apparatus and by selection of insulation recognized as being resistant to corona attack.

However, there have been reports of unexpected failures in certain wire insulations even though the voltage to which the insulated wire was subjected was too low for corona to occur. Thus, in testing insulated wires for use in wet locations, it has been observed that the application of AC potentials in the range of only 600 volts can cause insulation failure within a few days. This unusual phenomenon has been observed for a number of semi-crystalline polymer insulation materials such as high density polyethylene (C. A. Liddicoat and B. F. Brown, Wire and Wire Products, 38, 1874 (1963) and W. D. Paist, Wire and Wire Products, 39, 1587 (1964)) and polypropylene (M. Okada, Polymer Letters 3, 407 (1965)). Tests have also shown that wire insulations of the fluorocarbon resins, polytetrafluoroethylene(PTFE), fluorinated-ethylenepropylene (FEP), and perfluoroalkoxy (PEA) fluorocarbon, are subject to failure at the same low voltage AC under wet conditions.

These relatively low voltage deteriorations of insulating ability have been called "AC wet service failure" to distinguish from the type of deterioration due to corona discharge. The "AC wet service failure" deterioration is measured by an "Insulation Resistance Test" described below.

2. The Use of Fluorocarbon Resin as Electrical Insulation.

Despite deterioration at low voltages under wet conditions, fluorocarbon resins such as tetrafluoroethylene homopolymer and copolymers are recognized as having excellent electrical properties which make them useful as electrical insulations. The commercial processing of these resins into suitable form for use as insulation for electrical wire is carried out by one of two distinctly different fabrication technologies: namely, a. Paste Extrusion And Sintering
b. Melt Extrusion The first of these two fluorocarbon resin fabrication technologies used for the production of wire insulation is called "paste extrusion and sintering". The fabrication of wire insulation by the "paste extrusion and sintering" technology involves, first, forming or shaping the resin mass by a specific low temperature fibrillation process known as "paste extrusion" and subsequently "sintering" the resin mass at a temperature above 327° C.

The "paste extrusion and sintering" type of wire insulating fabrication is carried out with non-melt-processible tetrafluoroethylene polymers. These are polymers that cannot be melt-processed with usual melt-processing equipment because of their extremely high viscosities. Such polymers include the homopolymers of tetrafluoroethylene and copolymers of it and small amounts of comonomer, which amounts are too small to impart melt-processibility to the polymer. These polymers are prepared by the coagulation of aqueous dispersions of dispersion polymerized monomers, such as those described in Cardinal et al. U.S. Pat. No. 3,142,665.

In the "paste extrusion and sintering" process, the resin can be used to form a coating around an electrical conductor directly, or it can be used to form an unsintered tape, which can subsequently be wrapped around the conductor and sintered to form the insulated wire. Regardless of whether the insulation is formed directly or by way of unsintered tape, it is essential that the resin be fibrillatible in order that it can be fibrillated and subsequently sintered in thicknesses of about 0.1 mm or more without application of pressure and without formation of cracks in the coatings. The use of the sintering technology for commercial wire coating thus inherently requires selection of a resin composition capable of undergoing this specific fibrillation phenomenon. The non-melt-processible tetrafluoroethylene resins described above undergo the phenomenon. The unique crystal structure necessary for fibrillation in paste extrusion arises in the polymerization and is adversely affected by melting. Any tetrafluoroethylene polymer of copolymer previously heated above its crystalline melting point is not suitable for fabrication by paste extrusion and sintering.

It should be mentioned that "sintering" is a term having a specific meaning in the field of fluorocarbon resin processing and concerns the no-flow phenomenon characteristic of the sintering used in the fields of ceramics and powder metallurgy. Thus, although fluorocarbon resin sintering entails heating above the crystalline melting point, as measured by differential thermal analysis, the tetrafluoroethylene polymers applicable to this fabrication technology have such high molecular weights that they are practically form-stable, i.e., non-flowing, at usual sintering temperatures in the range of 327° to about 400° C. Therefore, sintering of non-melt processible resins is not the same as melt-processing (i.e., melt extrusion) of melt-processible resins. The sinterable, i.e., non-melt processible, resins do not sag or drip off wire during transit in making wire coating through the hot zone of the sintering over because their melt viscosities, measurable only by tensile creep, are in the range of $10^{10}$ to $10^{12}$ poise. This range is too "viscous" for processing by conventional melt fabrication methods. The term "sintering" is not used in connection with melt-processible fluorocarbon resins.

The second type of fabrication technique used for the production of fluorocarbon resin wire insulations is the technique of melt extrusion. In this technique conventional melt processing procedures used for other thermoplastic polymers are employed. However, only certain tetrafluoroethylene resins can be melt-processed. For example, M. I. Bro and B. W. Sandt, U.S. Pat. No. 2,946,763, describe a narrow range of melt-processible copolymers of tetrafluoroethylene and hexafluoropropylene having useful properties; and J. F. Harris, Jr., and D. I. McCane, U.S. Pat. No. 3,132,123, describe closely related melt processible copolymers of tetrafluoroethylene and perfluoroalkyl perfluorovinyl ethers.

These melt processible tetrafluoroethylene copolymers generally have melt viscosities in the range of $10^3$ to $10^7$ poise at their processing temperature. The melt extrusion coating of wire with some of these resins, using conventional single screw extruders, is described by D. I. McCane (Encyclopedia of Polymer Science and Technology, Vol. 13, pages 663-664, John Wiley & Sons, Inc., 1970).

The tetrafluoroethylene polymers useful in one of these two types of fabrication techniques cannot be used in the other type because any tetrafluoroethylene polymer useful for sintering fabrication technology for production of wire insulations must, of necessity, be a polymer having a molecular weight, crystal structure, and monomer content capable of fibrillation in paste extrusion to form the unsintered tape or unsintered wire covering and must then provide form stability and absence of cracking in the sintering step which follows. On the other hand, a tetrafluoroethylene copolymer useful in the melt processing technique must, of necessity, have a molecular weight and comonomer content to give the desired lower melt viscosity for melt processing, together with useful mechanical properties in the finished insulation. Thus, any fluorocarbon resin composition having the properties required for successful fabrication by paste extrusion and sintering is inherently unsuited for melt processing into wire insulation in the usual melt processing manner of operation. Its melt viscosity is much too high. Conversely, any fluorocarbon resin having the properties required for successful fabrication into wire insulation by melt processing in a conventional single screw extruder is inherently incapable of fibrillation as required for fabrication by paste extrusion and sintering.

3. Failure of Fluorocarbon Insulation at Low Voltage

Insulated electrical wire has commonly been made by both fabrication techniques described above using each respective type of fluorocarbon polymer. All such insulated wires exhibit insulation failure in wet locations when subjected to AC potentials in the range of about 600 volts. Specifically, they fail to pass an Insulation Resistance Test, described further below, in which they are subjected to 75° C. water for 12 weeks with 600 volts AC stress applied across the insulation (i.e., between wire conductor and the surrounding water).

The prior art, e.g., U.S. Pat. No. 3,150,207 to W. L. Gore, teaches use of tetrafluoroethylene polymers to make insulated wire by the technique using a fibrillatable polymer and teaches that if a dielectric fluid, e.g., a silicone, is mixed with and incorporated in the polymer, the resulting insulation is resistant to corona as measured by subjecting the insulated wire to 3000-6000 volts in water containing a wetting agent. However, when such insulated wires are subjected to the Insulation Resistance Test discussed in the proceding paragraph, deterioration occurred under wet conditions, i.e., they undergo "AC wet service failure." Accordingly, fibrillatable tetrafluoroethylene polymer compositions having good corona resistance do not provide a means of achieving acceptable resistance to AC wet service failure; apparently the failure mechanism of wet service at low voltage (e.g., 600 volts) is different from that of corona attack at high voltage (e.g., 3000-6000 volts).

SUMMARY OF THE INVENTION

A composition which when coated onto wire has good resistance to deterioration under low voltage AC stress in hot water is provided by this invention. The composition comprises (a) a melt-processible copolymer consisting essentially of units of tetrafluoroethylene and at least one comonomer represented by the formula

wherein $R_1$ is F, H or Cl; and when $R_1$ is F, H or Cl, $R_2$ can be $-R_F$, $-OR_F$, $-R_F'X$ or $-OR_F'X$ in which $R_F$ is a linear perfluoroalkyl radical of 1-5 carbon atoms, $-R_F'$ is a linear perfluoroalkylene diradical of 1-5 carbon atoms in which the valences are at each end of the linear chain, and X is H or Cl;

and when $R_1$ is F, $R_2$ can be

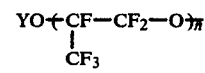

wherein n is 1 or 2 and Y is perfluoroalkyl of 1-9 carbon atoms, or can be

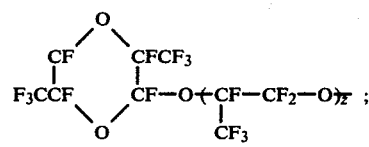

wherein z is 0, 1 or 2;

with the proviso that $R_1$ and $R_2$ taken together can be the diradical

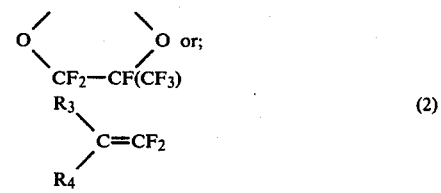

where $R_3$ and $R_4$ are independently $-CF_3$ or $CF_2Cl$, and (b) an organo-polysiloxane that is substantially stable and nonvolatile at the temperature of melt-processing for the copolymer used and is substantially incompatible with the copolymer, said organo-polysiloxane being present in the composition in an amount of between about 0.2 and 5% by weight based on weight of the composition and being dispersed in the copolymer.

In addition, the process of the invention comprises (1) coating a melt-processible copolymer resin defined as above with between about 0.2 and 5% by weight based on weight of the composition of an organo-polysiloxane, (2) melting the coated resin, and (3) subjecting the melted coated resin to a shear force sufficient to disperse the organo-polysiloxane within the copolymer.

One embodiment of the process also comprises (1) subjecting a melt-processible copolymer resin, defined as above, to pressure sufficient to cause the resin to pass through the zones in which the remainder of steps of the process occur, (2) melting said resin either prior to or subsequently to or simultaneously with said pressuring, and after carrying out steps (1) and (2), (3) adding to the melted resin between about 0.2 and 5% by weight based on weight of composition of an organo-polysiloxane, and (4) subjecting the mixture of step (3) to a shear force sufficient to disperse the organopolysiloxane within the copolymer.

DESCRIPTION OF THE INVENTION

The melt-processible tetrafluoroethylene copolymers employed herein are copolymers made from tetrafluoroethylene and at least one comonomer selected from the ones described above. Preferably the comonomers are perfluoro (alkyl vinyl ethers) containing 3–7 carbon atoms and perfluoro (terminally unsaturated olefins) containing 3–7 carbon atoms. Representative comonomers include hexafluoropropylene, perfluorohexene-1, perfluorononene-1, perfluoro(methyl vinyl ether), perfluoro(n-propylvinyl ether), perfluoro(n-heptyl vinyl ether) and the like.

By the term "melt-processible" is meant that the copolymer can be processed (i.e., fabricated into shaped articles such as films, fibers, tubes, wire coatings and the like) by conventional melt extruding means. Such requires that the melt viscosity at the processing temperature be no more than $10^7$ poise. Preferably it is in the range of $10^3$ to $10^7$ poise, and most preferably $10^4$ and $10^6$ poise. Thus, the amount of comonomer present in the melt-processible tetrafluoroethylene copolymers will be an amount sufficient to impart melt-processibility to the copolymer. Generally, for the perfluoro (alkyl vinyl ethers), this amount will be at least 0.5% by weight based on weight of copolymer, and can be up to about 20%. Preferably the amount will be about 3–5% and the alkyl group will be n-$C_3F_7$. Generally, for the perfluoro (terminally unsaturated olefin), the amount will be at least about 10% by weight based on weight of copolymer, and can be up to about 25%. Preferably the amount will be about 15–17% and the olefin will be $C_3F_6$.

The copolymers are substantially nonelastomeric. In other words, the copolymers are partially crystalline, and, after extrusion, do not exhibit a rapid retraction to substantially the original length from a stretched condition of 2× at room temperature. The copolymers will become elastomeric if too much comonomer is present. Exactly how much depends on the molecular weight of the comonomer. The smaller the comonomer the more can be present without having the copolymer become elastomeric.

The melt viscosity of the copolymers is measured according to ASTM D-1238-52T modified by (1) using a cylinder, orifice and piston tip made of a corrosion-resistant alloy, Haynes Stellite 19, (2) charging a 5.0 g sample to the 9.53 mm inside diameter cylinder which is maintained at 372° C.±1° C., (3) extruding the sample 5 minutes after charging through a 2.10 mm diameter, 8.00 mm long square-edged orifice under a load (piston plus weight) of 5000 g (this corresponds to a shear stress of 0.457 kg/cm$^2$). The melt viscosity in poise is calculated as 53150 divided by the observable extrusion rate in grams per minute.

The organo-polysiloxane can be liquid or gum and is substantially stable (i.e., nondecomposible) and substantially nonvolatile at the processing temperature of the copolymer employed (i.e., some decomposition or volatilization can be tolerated). The polysiloxane is substantially incompatible with the melt-processible copolymer. By the term "incompatible" is meant that the materials are lacking in mutual solubility. The amount of polysiloxane present in the copolymer/polysiloxane composition will be between about 0.2 and 5% based on weight of the composition and preferably between about 0.5 and 3%.

Preferably, the organo-polysiloxane will have the structure

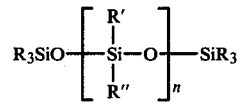

wherein R' and R" are each independently a hydrocarbyl group of 1–20 carbon atoms and one of R' and R" can be hydrogen, n is an integer of between about 5 and 5000, preferably between 10 and 2000, and most preferably between 10 and 100 and R is lower (i.e., 1–4 carbon atoms) alkyl or phenyl, and wherein the polysiloxane can be a homopolymer or a copolymer with another polysiloxane having different hydrocarbyl R' and R" substituents. More preferably R' and R" are each independently alkyl of 1–10 carbon atoms, aryl of 6–10 carbon atoms, alkaryl of 7–11 carbon atoms, or aralkyl of 7–11 carbon atoms.

Representative organo-siloxanes include phenyl methyl siloxane, dimethyl siloxane, monophenyl siloxane, propyl-modified phenyl siloxane, and a copolymer of phenyl methyl siloxane and dimethyl siloxane.

The organo-polysiloxane is dispersed in the copolymer as a result of the mechanical mixing of the resin and the polysiloxane. The polysiloxane is generally dispersed in a random heterogeneous fashion which can, however, appear to be uniformly dispersed to the unaided human eye. The siloxane is dispersed predominantly in irregularly shaped nonspherical, finely divided form.

Conventional melt blending procedures for blending melt-processible polymers and additives are, in general, not applicable for blending the melt-processible tetrafluoroethylene polymers and the organo-siloxane, for several reasons.

Firstly, the melt viscosities of the melt processible tetrafluoroethylene copolymer resins at their melt processing temperatures are 10 to 100 times greater than the usual melt viscosities of other thermoplastic polymers; and conventional apparatus commonly used for blending thermoplastic polymers with other materials is generally not adaptable to blend them with such viscous materials.

Secondly, the high temperature necessary for melt processing of melt-processible tetrafluoroethylene copolymer resins results in a considerable thinning of the liquid or gum; and conventional melt processing techniques are not adaptable to blending a polymer phase of unusually high viscosity with a liquid or gum phase of lower viscosity.

Thirdly, the polysiloxane liquids and gums are substantially incompatible with the melt-processible tetrafluoroethylene copolymer resins; whereas the blending of a plasticizing fluid into a conventional thermoplastic resin is ordinarily aided by the compatibility of the components.

Thus, attempts to blend an organo-polysiloxane with a melt-processible perfluorinated copolymer on a conventional electrically-heated differential speed roll mill and in a conventional single screw extruder were unsuccessful, resulting in poor dispersion of the siloxane. Generally, the siloxane remained segregated (usually as large drops) and did not disperse throughout the copolymer.

In addition, melt-processible tetrafluoroethylene copolymer resins are not normally available in a convenient porous state for impregnation as are the fibrillatable coagulated dispersion powders or unsintered tapes made from the fibrillatable extrudable resins. Instead, such melt-processible resins are available commercially as previously melted solid material obtained from extruding linear strands and cutting them into cylindrical pellets (e.g., about 2.5 mm in diameter and length). These solid pieces have very low surface area, and addition of a small amount (e.g., about 1%) of a gum or an oily liquid, such as a polysiloxane, results in a liquid-coated mass of particles which is so slippery that it is difficult or impossible to transmit sufficient shear energy into the particles to effect a blending action in the usual plastics melt processing equipment.

Accordingly, the compositions of this invention are prepared by employing a means which overcomes the difficulties described above. This can be accomplished by separating the transporting function and the melt mixing function into two separate zones. For example, a solids metering screw and barrel can be used as a transporting zone, while melting and mixing can be carried out in a subsequent zone containing an independently driven mixing shaft operated at a speed sufficient to develop shear which causes the siloxane to disperse. In another embodiment, a corotating, self-wiping twin screw extruder can be employed as the transporting zone, while a set of kneading blocks in a zone subsequent to the screw zone operates to develop the necessary shear.

In the transporting zone, the copolymer can first be melted and subjected to pressure sufficient to move the melted mass into the mixing zone, where it is combined and mixed with the siloxane. Alternatively, in the transporting zone, the siloxane can be coated on the solid copolymer and then the polymer melted (as in a twin screw extruder) before mixing the two in a mixing zone which develops the necessary shear force.

Various additives, such as pigments (e.g., titanium dioxide or carbon black), fillers (e.g., glass particles or graphite), and reinforcing agents (e.g., fibrous materials such as asbestos or glass fibers) can be present in the compositions of this invention. When high pigment or filler loadings are used, some of the polysiloxane is absorbed on the solid surfaces of the pigment or filler, and it is often desirable to increase the polysiloxane level accordingly to achieve the desired processing behavior or product properties. With loadings of several percent or more of electrically conductive fillers, such as carbon or graphite, it may be observed that electrical properties are altered in a manner less favorable for use as wire coatings but more favorable for use as electrically semiconductive or thermally conductive components or coatings.

The melt-processible tetrafluoroethylene copolymer compositions of the present invention are useful as wire insulations for use in wet locations for AC power wiring at voltages below the corona inception level. Such wet locations are often encountered in industrial plants, particularly in connection with pumps and scrubbers for pollution abatement and in the operation of downhole, submersible pumps used for oil recovery in deep wells.

Moreover, it has been found that improved dispersion of pigments and other solid fillers in the tetrafluoroethylene copolymers is obtained when the organo-polysiloxane is present and higher loadings of such pigments and fillers can be extruded successfully. It has also been found that the presence of the organo-polysiloxane in the copolymers facilitates melt extrusion of their resins by providing reduced back pressure in extrusion, reduced power consumption in extrusion equipment, extrusion at lower temperatures, and production of smooth-surfaced extrudates at up to 50% higher rates than are possible in the absence of polysiloxane. The benefits described in this paragraph are obtained whether one uses the tetrafluoroethylene copolymers described herein or other melt-processible tetrafluoroethylene copolymers such as ethylene/tetrafluoroethylene copolymers or terpolymers with the poly-siloxane.

In the Examples which follow, the "Insulation Resistance Test" employed is described generally in Underwriters Laboratory Subject 44 publication. Specifically, electrical wire coated with insulation material is formed into a coil 15.25 meters in length with both ends protruding and connected together. The coil is suspended by its lead wires into a vessel of water at 75° C., the vessel being made of either stainless steel or glass with a stainless steel screen liner. A potential of 600 volts alternating current (root-mean-square) 60 hertz is applied between the protruding lead wires and the stainless steel vessel or screen, as the case may be, contacting the water. From time to time, the 600 volt AC connections are removed briefly and the insulation resistance between the wire ends and the metal vessel or the metal screen liner is measured using a 500 volt DC power supply in series with an electrometer capable of reading currents as low as $10^{-12}$ ampere. Current readings are taken one minute after application of DC voltage. Current for 15.25 meters of wire is multiplied by a factor of 20 in order that results will be converted to the basis of 305 meters of the insulated wire. Insulation resistance is then calculated using Ohm's Law. The alternating 600 volt potential is applied at all times except while DC readings are being taken.

Insulation resistance readings are taken at least once per week for a period of at least 12 weeks. Insulation resistance (or logarithm of insulation resistance) is plotted graphically as a function of time. An insulation is considered to have failed this test if the insulation resistance drops below 10 megohms (305 meter basis) during 12 weeks of exposure. An insulation is considered to have passed if the insulation resistance at the end of 12 weeks is 10 megohms or greater (305 meter basis) and there is no substantial decrease in insulation resistance during the last 3 weeks of the 12 week period. Some variation in individual data points is considered acceptable as long as the predominant trend of the insulation resistance plot is clearly evident. All insulation resistance values reported hereinbelow are calculated on the 305 meter basis as described above.

The Examples which follow illustrate the invention, while the Comparisons which follow compare the products of the Examples with products not within the invention.

EXAMPLE 1

A melt processible copolymer of recurring units of tetrafluoroethylene and about 16% by weight of units of hexafluoropropylene (referred to hereinafter as FEP) and having a melt viscosity of about $8 \times 10^4$ poise when measured at a temperature of 372° C. (commercially available as "Teflon" 100 FEP fluorocarbon resin) was used as starting material. A 2300 g portion of this resin in its original form (solid cylindrical pellets of about 0.25 cm length and diameter) was added to a Banbury mixer which had been preheated to about 165° C. The mixer was run at 230 rpm causing the FEP resin to melt and the temperature to rise to 300° C. A separate 325 g of FEP resin was ground to a finely divided powder, greatly increasing its surface area, and to this powder was added 75 g of a copolymer of methylphenylsiloxane and dimethyl siloxane (Dow-Corning 550 fluid). The two materials were intimately mixed in a mortar. The mixture of FEP powder and siloxane was divided into four portions and added, one-fourth at a time, to the melted FEP in the mixer. After each addition, the mixer was run for several minutes to blend the materials and bring the temperature back up to the range of 290°–300° C. In this way, the fluid was gradually blended into the polymer and dispersed without causing a sudden excessive lubrication of the mixing elements, which would cause slippage of materials and a loss of shear energy transfer from the mixing elements to the polymer mass. After the last addition, the mixing was continued for 3 minutes at 290° C., the mixer was stopped and cooled to 180° C., and the polymer blend was discharged. After further cooling, the product was ground to obtain particles that passed through a 0.95 cm mesh screen.

The ground particles were then melt extruded through a 3.8 cm diameter plastics processing extruder having a constant pitch, rapid compression, metering type screw, and an electrically heated barrel. The melted composition was extruded at a temperature of about 360° C. The melt passed through a 0.63 cm diameter die and the melt strand was drawn down to about 0.32 cm diameter, cooled in water, and chopped into cylindrical pellets about 0.32 cm in length.

The pellets contained 2.8% silicone oil. They were then processed in a 3.8 cm diameter melt extruder, equipped with a wire coating crosshead and a tube-type die, such that the polymer melt at 350° C. was extruded from an annular opening of 1.26 cm OD and 0.76 cm ID. The melt was drawn down onto a copper wire conductor (AWG 22, 7 strands) to produce a tight coating of 0.25 millimeters wall thickness.

The coated wire passed the Insulation Resistance Test, giving an insulation resistance value of $4.9 \times 10^4$ megohms after 12 weeks in 75° C., water at 600 volts AC stress with no substantial decrease in resistance during the last three weeks. The test was continued, but no decrease in insulation resistance was observed after 101 weeks' total exposure. This good result is much better than the results obtained when no siloxane is present, as seen in the following Comparison.

COMPARISON WITH EXAMPLE 1

For comparison purposes, five 15.25 meter coils of wire were prepared for the Insulation Resistance Test, as in Example 1. The polymer compositions employed were all "Teflon" 100 FEP fluorocarbon resins that did not contain any siloxane. These represented three different resin lots and three wire coating extrusion runs.

All five of these coils failed the Insulation Resistance Test within 3 to 12 days. The average time of failure (by insulation resistance dropping below 10 megohms) was 4.6 days.

EXAMPLE 2

The procedure of Example 1 was followed to make a wire insulated with "Teflon" 100 FEP fluorocarbon resin containing 1.0% of a copolymer of methylphenylsiloxane and dimethyl siloxane (DC 550) fluid. This wire passed the Insulation Resistance Test, giving an insulation resistance value of $8.1 \times 10^4$ megohms after 12 weeks' exposure to 600 volts AC in 75° C. water with no substantial decrease in resistance during the last 3 weeks.

EXAMPLE 3

A composition of the present invention was made by a continuous process which involved using the specialized apparatus described by G. B. Dunnington and R. T. Fields in U.S. Pat. No. 3,325,865. A key element of this apparatus is a separation of functions into zones, one zone being a solids metering feed screw and barrel (described in Example 1 of said U.S. Pat. No. 3,325,865) capable of transporting slippery, unmelted particulate materials and generating pressure to force the material through the apparatus, and a second zone being a 50 mm diameter melting and mixing barrel having an independently driven mixing element capable of rotation at higher speed than the solids metering screw. The feed material was a mixture of "Teflon" 100 FEP resin with 1% by weight of polymethylphenylsiloxane (Dow-Corning 710 fluid) coated over the particles. Prior to coating the FEP resin, the surface area of the resin was increased by crushing the original cylindrical particles in an unheated Banbury mill and using only the portion passing through 0.282 cm screen openings prior to mixture with the fluid. The solids metering feed screw was operated at 13 rpm, while the mixing element was operated at 120 rpm. The temperature in the mixing section was about 320° C., and the blended product was extruded at a rate of 19.8 kg/hr through a strand die. The extrudate was water-quenched and cut into cylindrical pellets. Infrared analysis indicated about 1% of DC 710 fluid in the pellets. The pellets were then re-extruded in a conventional wire coating extruder, as in Example 1, to form insulation of 0.25 mm thickness on AWG 22 stranded conductor. Two coils of the coated wire were subjected to the Insulation Resistance Test; both passed, giving insulation resistance values at the end of 12 weeks' exposure of $1.56 \times 10^6$ and $6.6 \times 10^5$ megohms with no substantial decrease in resistance during the last 3 weeks.

EXAMPLE 4

The procedures and apparatus of Example 3 were employed using "Teflon" 100 FEP resin and 0.28% by weight of Dow-Corning 710 fluid. Insulation resistance values of duplicate coils after 12 weeks' exposure in the Insulation Resistance Test were $5.3 \times 10^5$ and $8.9 \times 10^5$ megohms and the coated wires showed no substantial decrease in resistance during the last 3 weeks.

COMPARISON WITH EXAMPLE 4

The procedure and apparatus of Example 3 were empoloyed using "Teflon" 100 FEP resin and 0.17% by weight of Dow-Corning 710 fluid. Duplicate coils did not retain insulation resistance in the Insulation Resistance Test sufficient to pass the 12 week test.

EXAMPLE 5

The apparatus of Example 3 was modified by addition of a 16.8 cm long barrel section between the solids metering section and original melter-mixer barrel. The inner wall of the new barrel section was contoured with eight smooth-surfaced longitudinal ridges. Turning within the new barrel section was an added mixing element having the cross-section of a regular hexagon and driven by attachment at one end of the mixing element of the original melter-mixer.

"Teflon" 100 FEP fluorocarbon resin in cylindrical pellet form was dry blended by tumbling with 0.2% by weight of titanium dioxide pigment and the resin-pigment blend fed directly to the solids metering screw turning at 10 rpm. The material passed through the solids metering section, the two melting and mixing sections at about 320° C., and exited through a single strand die. Mixing speed was about 100 rpm and throughput rate 29.25 kg/hr. Polymethylphenylsiloxane (Dow-Corning DC 710 fluid) was pumped into the extruder through a port in the wall near the entrance end of the new 16.8 cm long barrel section at a rate calculated to provide 1% by weight of the siloxane fluid in the product. Microscopic examination of the product showed the pigment dispersion to be excellent and considerably more uniform than normally obtained in resin-pigment blends made by melt processing in the absence of the fluid additive. The product was used to make 810 meters of wire insulated with 0.38 mm wall thickness and 810 meters with 0.51 mm wall thickness on AWG 14 solid copper conductor using ordinary melt processing methods in a 6.35 cm diameter single screw extruder. Five 15.25 meter specimens from the 0.38 mm insulated wire were subjected to the Insulation Resistance Test modified by making conditions more severe than the standard test by raising the water temperature to 90° C. All specimens retained insulation resistance higher than 10 megohms for a period of 12 weeks with no substantial decrease in resistance during the last 3 weeks. Six 15.25 meter specimens from the 0.51 mm insulated wire were tested with similar results. Exposure of the 11 coils of wire to 600 volts AC in 90° C. water was continued to 125 weeks (over 10 times the normal time requirement) with substantially no deterioration of insulation resistance.

EXAMPLE 6

The procedure of Example 5 was used to make a composition of FEP fluorocarbon resin containing 0.2% by weight of carbon black and 1% by weight of polymethylphenylsiloxane fluid. The composition was used to coat 3 km of AWG 14 solid conductor having 0.38 mm insulation and 2.07 km of the conductor having 0.51 mm insulation. Six coils each of the 0.38 and 0.51 mm insulated wire were placed on test. All 12 specimens passed the Insulation Resistance Test through the 12 weeks' exposure to 600 volts alternating current at 90° C. and retained high insulation resistance in continued exposure to a total of 125 weeks.

EXAMPLE 7

A twin screw extruder manufactured by the Werner & Pfleiderer Corporation, type ZSK 83, having barrel diameters of 83 mm and barrel length of 2520 mm, was set up with a series of screw bushings and kneading blocks appropriately selected to accomplish mixing of resin and siloxane. The screw bushing elements of the two screws were co-rotating, intermeshing, and self-wiping, a mechanical configuration which has been found to be capable of transporting slippery materials at uniform rate. Various screw bushings were placed on the screw shafts to provide five separate screw zones on each screw shaft. Kneading block elements were also placed on each shaft to provide four kneading zones between the five screw zones. The functions within the extruder were thus separated into zones, material transport being accomplished by the screw zones and dispersal of the low viscosity fluid into the high viscosity polymer melt being accomplished by intense shear action within the kneading zones.

"Teflon" 100 FEP resin pellets were fed to a hopper over the first screw section at a metered rate of about 65.25 kg/hr. Simultaneously, Dow-Corning 710 fluid was pumped into the same hopper at a rate of 0.6525 kg/hr. The twin screws were rotated at 33 rpm, and the material was transported smoothly through the heated barrels. The melt blend composition exited at a temperature of 305° C. through an 8 hole strand die. Strands were water-quenched and cut into 0.25 cm pellets.

In order to make colored wire coatings, 10 parts by weight of the above pellets were dry blended with 1 part of commercially available "Teflon" 100 FEP red pigmented color concentrate pellets. The color concentrate did not contain silicone fluid. The dry blend was fed to a conventional 5.1 cm screw extruder set up to apply 0.38 mm of insulation to an AWG 14 stranded wire by usual melt processing methods.

The coated wire had a uniform red appearance, and its performance capabilities were demonstrated by first heat aging the wire in an oven for 1 week at 180° C. and then using two 15.25 meter coils of the coated wire in the Insulation Resistance Test. Insulation resistance values after 12 weeks were $2.1 \times 10^5$ and $2.3 \times 10^5$ megohms with no substantial decrease during the last 3 weeks. Continued exposure to a total of 105 weeks showed substantially no loss of insulation resistance.

EXAMPLE 8

The twin screw extrusion apparatus of Example 7 was used in the procedure of Example 7. In place of the "Teflon" 100 FEP pellets, a melt processible copolymer of tetrafluoroethylene and about 4 wt.% perfluoro-n-propyl perfluorovinyl ether having a melt viscosity of about $4 \times 10^4$ poise at 372° C. was used. Dow-Corning 710 silicone fluid was metered in to provide 1% by weight of it in the feed. The twin screw extruder temperature was adjusted to give a melt temperature of about 330° C. for the blending operation with the resin. The extruded product was used for wire coating using the same single screw extruder as in Example 7, but in this case, no color concentrate was used.

Two 15.25 meter coils of AWG 14 stranded wire, insulated with 0.38 mm of this composition, gave insulation resistance values in the Insulation Resistance Test of $8.9 \times 10^4$ and $9.6 \times 10^4$ megohms after 12 weeks' test exposure with no substantial decrease in resistance during the last 3 weeks.

COMPARISON WITH EXAMPLE 8

For comparison purposes, four 15.25 meter coils of AWG 14 stranded wire insulated with 0.38 mm of the same resin but without the silicone fluid additive were tested in the Insulation Resistance Test. All four failed within 8 days' exposure to 600 volts in 75° C. water, one having an insulation resistance of 1.25 megohms and the other three being short circuited.

EXAMPLE 9 AND COMPARISON WITH EXAMPLE 9

This Example and its Comparison demonstrate that the composition of the invention described hereinbelow exhibited substantially no enhancement in resistance to corona. A composition prepared as described in Example 3 was subjected to the corona resistance test described in ASTM D 2275-68 titled "Voltage Endurance Under Corona Attack of Solid Electrical Insulating Materials." A test specimen was $11.4 \times 43.2$ cm in size and 305 microns in thickness. It was placed on a conductive metal base and contacted from above at 10 positions by cylindrical electrodes 1.27 cm in diameter with edges rounded to 0.15 cm radius. A voltage of 2400 AC (root-mean-square) at 360 hertz was applied, and the time of failure by corona attack at each electrode was recorded. Corona endurance was taken as the time required for failure at 5 of the 10 test electrodes. The composition possessed a corona endurance time of 26.4 hours. Another test specimen prepared from the same starting polymer but containing no organopolysiloxane possessed a corona endurance time of 23.9 hours. The difference between these values is only about 10%. This lack of substantial difference is surprising when viewed in the light of the orders of magnitude greater increase in corona resistance obtained when fibrillatable PTFE containing silicone oil is compared with a fibrillatable polytetrafluoroethylene that does not contain silicone oil using the corona endurance test described in U.S. Pat. No. 3,150,207 at column 2, lines 29-41.

The embodiments of the invention in which an exclusive property or privilege is claimed are defined as follows:

1. A composition consisting essentially of
   (a) a melt-processible copolymer that is incapable of fibrillation and which consists essentially of units of tetrafluoroethylene and at least one comonomer represented by the formula

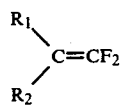
(1)

wherein $R_1$ is F, H or Cl; and $R_2$ is $-R_F' X$ in which $-R_F'$ is a linear perfluoroalkylene diradical of 1-5 carbon atoms in which the valences are at each end of the linear diradical, and X is F, H or Cl; or

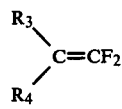
(2)

where $R_3$ and $R_4$ are independently $-CF_3$ or $CF_2Cl$; said comonomer present in the copolymer in an amount of between 10 and 25% by weight of copolymer; said copolymer having a melt viscosity between about $10^3$-$10^7$ poise at the melt processing temperature;

(b) an organo-polysiloxane that is substantially stable and nonvolatile at the temperature of melt-processing for the copolymer used and is substantially incompatible with the copolymer, said organo-polysiloxane present in the composition in an amount between about 0.2 to 5% by weight based on weight of the composition and being dispersed in the copolymer, and said organo-polysiloxane being a homopolymer or copolymer represented by the formula

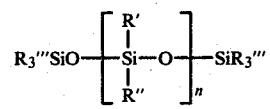

wherein R' and R" are each independently a hydrocarbyl group of 1 to 20 carbon atoms and one of R' and R" can be hydrogen, n is an integer of between about 5 and 5000, and R''' is lower alkyl or phenyl.

2. The composition of claim 1 wherein the comonomer is a perfluoro(terminally unsaturated olefin) containing 3-7 carbon atoms.

3. The composition of claim 2 wherein the comonomer is hexafluoropyropylene.

4. The composition of claim 3 wherein the comonomer is present in the copolymer in an amount between about 15 and 17% by weight of the copolymer.

5. The composition of claim 1 wherein in said organo-polysiloxane R' and R" are each independently alkyl of 1-10 carbon atoms, aryl of 6-10 carbon atoms, alkaryl of 7-11 carbon atoms or aralkyl of 7-11 carbon atoms, and one of R' and R" can be hydrogen; R''' is lower alkyl and n is an integer between about 10 and 100.

6. The composition of claim 5 wherein the comonomer is hexafluoropropylene.

7. The composition of claim 6 wherein the organo-polysiloxane is polymethylphenyl siloxane.

8. The composition of claim 7 wherein the hexafluoropropylene is present in an amount of 15-17 weight percent.

9. The composition of claim 1 which contains a filler.

10. The composition of claim 9 wherein the filler is graphite or carbon black.

11. A composition consisting essentially of
    (a) a melt-processible copolymer that is incapable of fibrillation and which consists essentially of units of tetrafluoroethylene and at least one comonomer represented by the formula

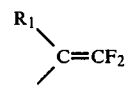

wherein $R_1$ is F, H or Cl; and when $R_1$ is F, H or Cl, $R_2$ is —$OR_F'X$ in which $R_F'$ is a linear perfluoroalkylene diradical of 1–5 carbon atoms in which the valences are at each end of the linear diradical, and X is F, H or Cl; and when $R_1$ is F, $R_2$ can be

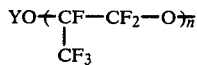

wherein n is 1 or 2 and Y is perfluoroalkyl of 1–9 carbon atoms, or can be

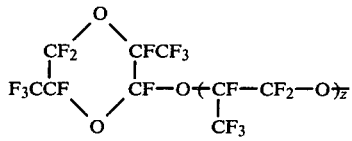

wherein z is 0, 1 or 2;
with the proviso that $R_1$ and $R_2$ taken together can be the diradical

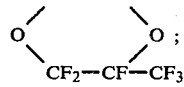

said comonomer present in an amount of between 0.5 and 20% by weight based on weight of copolymer; and said copolymer having a melt viscosity between about $10^3$–$10^7$ poise at the melt producing temperature;

(b) an organo-polysiloxane that is substantially stable and nonvolatile at the temperature of melt-processing for the copolymer used and is substantially incompatible with the copolymer, said organo-polysiloxane present in the composition in an amount between about 0.2 to 5% by weight based on weight of the composition and being dispersed in the copolymer, and said organo-polysiloxane being a homopolymer or copolymer represented by the formula

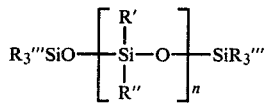

wherein R' and R'' are each independently a hydrocarbyl group of 1 to 20 carbon atoms and one of R' and R'' can be hydrogen, n is an integer of between about 5 and 5000, and R''' is lower alkyl or phenyl.

12. The composition of claim 11 wherein the comonomer is a perfluoro(alkyl vinyl ether) containing 3–7 carbon atoms.

13. The composition of claim 12 wherein the comonomer is perfluoro(propyl vinyl ether).

14. The composition of claim 13 where the comonomer is present in an amount between about 3% and 5% by weight of copolymer.

15. The composition of claim 11 wherein in said organo-polysiloxane R' and R'' are each independently alkyl of 1–10 carbon atoms, aryl of 6–10 carbon atoms, alkaryl of 7–11 carbon atoms or aralkyl of 7–11 carbon atoms, and one of R' and R'' can be hydrogen; R''' is lower alkyl and n is an integer between about 10 and 100.

16. The composition of claim 15 wherein the comonomer is perfluoro(propyl vinyl ether).

17. The composition of claim 16 wherein the organopolysiloxane is polymethylphenyl siloxane.

18. The composition of claim 17 wherein the perfluoro(propyl vinyl ether) is present in an amount of 3–5 weight percent.

19. The composition of claim 11 which contains a filler.

20. The composition of claim 19 wherein the filler is graphite or carbon black.

21. A process which comprises
(1) coating a melt-processible copolymer resin defined as in claim 1 with between about 0.2 and 5% by weight based on weight of the composition of an organo-polysiloxane defined as in claim 1,
(2) melting the coated resin, and
(3) subjecting the melted coated resin to a shear force sufficient to disperse the organo-polysiloxane within the copolymer.

22. A process which comprises
(1) subjecting a melt-processible copolymer resin defined as in claim 1 to pressure sufficient to cause the resin to pass through the zones in which the remainder of the steps of the process occur,
(2) melting said resin either prior to or subsequently to or simultaneously with said pressuring, and after carrying out steps (1) and (2),
(3) adding to the melted resin between about 0.2 and 5% by weight based on weight of composition of an organopolysiloxane, and
(4) subjecting the mixture of step (3) to a shear force sufficient to disperse the organopolysiloxane within the copolymer.

23. A process which comprises
(1) coating a melt-processible copolymer resin defined as in claim 11 with between about 0.2 and 5% by weight based on weight of the composition of an organo-polysiloxane defined as in claim 11,
(2) melting the coated resin, and
(3) subjecting the melted coated resin to a shear force sufficient to disperse the organo-polysiloxane within the copolymer.

24. A process which comprises
(1) subjecting a melt-processible copolymer resin defined as in claim 11 to pressure sufficient to cause the resin to pass through the zones in which the remainder of the steps of the process occur,
(2) melting said resin either prior to or subsequently to or simultaneously with said pressuring, and after carrying out steps (1) and (2),
(3) adding to the melted resin between about 0.2 and 5% by weight based on weight of composition of an organopolysiloxane, and
(4) subjecting the mixture of step (3) to a shear force sufficient to disperse the organopolysiloxane within the copolymer.

* * * * *